(12) United States Patent
Nagase

(10) Patent No.: US 7,289,918 B2
(45) Date of Patent: Oct. 30, 2007

(54) PORTABLE LEAK DETECTOR

(75) Inventor: Mamoru Nagase, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 0 days.

(21) Appl. No.: 10/467,017

(22) PCT Filed: Feb. 8, 2002

(86) PCT No.: PCT/JP02/01116

§ 371 (c)(1),
(2), (4) Date: Jan. 6, 2004

(87) PCT Pub. No.: WO02/066950

PCT Pub. Date: Aug. 29, 2002

(65) Prior Publication Data

US 2004/0122602 A1    Jun. 24, 2004

(30) Foreign Application Priority Data

Feb. 20, 2001 (JP) .............................. 2001-043552

(51) Int. Cl.
*G01F 23/00* (2006.01)
*G01L 7/00* (2006.01)

(52) U.S. Cl. ...................................................... 702/51

(58) Field of Classification Search .................. 702/45, 702/48, 50, 51, 54, 56; 73/40, 40.5 R, 40.5 A, 73/592, 632, 645
See application file for complete search history.

(56) References Cited

U.S. PATENT DOCUMENTS 5,708,195 A * 1/1998 Kurisu et al. ............. 73/40.5 R
6,247,353 B1 * 6/2001 Battenberg et al. ...... 73/40.5 A
6,957,157 B2 * 10/2005 Lander ....................... 702/56

FOREIGN PATENT DOCUMENTS

| EP | 1 371 962 | * 12/2003 |
|---|---|---|
| JP | 60-90499 | 5/1985 |
| JP | 01-098939 | * 4/1989 |
| JP | 05-281104 | 10/1993 |
| JP | 06-110117 | 4/1994 |
| JP | 07-253376 | * 10/1995 |
| JP | 09-284703 | 10/1997 |
| JP | 11-051300 | * 2/1999 |
| JP | 11-174110 | 11/1999 |
| JP | 11-331977 | 11/1999 |
| JP | 2001-036840 | 2/2001 |
| JP | 2001-305005 | * 10/2001 |
| JP | 2001-305006 | * 10/2001 |
| JP | 2002-243577 | * 8/2002 |
| JP | 2003-337064 | * 11/2003 |

* cited by examiner

*Primary Examiner*—Michael Nghiem
(74) *Attorney, Agent, or Firm*—The Webb Law Firm

(57) ABSTRACT

A mobile leakage detecting device according to the present invention is provided for simplifying detecting operations of a leak portion and enhancing operational efficiency, and is characterized by microphones for detecting ultrasonic waves generated at a fluid leak portion, an input device for inputting positional information of the leak portion in a searching area detected based on output signals from the microphones, a photograph device for photographing the leak portion, a display device for indicating the positional information inputted by the input device and photographed image information of the leak portion obtained by the photograph device and data processing device for relating with one another and storing the output data from the microphones, positional information inputted by the input device and photographed image information obtained by the photograph device on the same leak portion.

13 Claims, 8 Drawing Sheets

PORTABLE LEAK DETECTOR

TECHNICAL FIELD

The present invention relates to a mobile leakage detecting device for detecting fluid leak portions of a piping system, a vessel or the like in a plant or a factory. More particularly, the invention relates to a mobile leakage detecting device for detecting fluid leak portions based on output signals from a microphone for detecting ultrasonic waves generated from the leak portions.

BACKGROUND ART

One example of conventional mobile leakage detecting device of this type comprises a single directional microphone for detecting ultrasonic waves generated from fluid leak portions, and a display device for visually indicating, in digital or bar-graphical representation, detected ultrasonic wave data obtained by processing an output signal from the microphone (see Japanese Patent Application "Kokai" No. Hei. 7-253377, for example).

With this conventional detecting device, it is possible to detect, by detection of the generated ultrasonic waves, an extremely fine leak portion which is not detectable by a detecting device for finding a leak portion based on detection of a sound generated in an audible range. However, it can merely provide a function of detecting the leak portion by utilizing the inaudible generated ultrasonic waves whether the detected ultrasonic wave data is visually indicated as noted above, or is audibly outputted by using an earphone or the like. More particularly, it causes the operator a considerable trouble and burden in carrying out incidental operations for recording in detail a position where the detected fine leak portion is present and peripheral conditions thereof. With respect to these aspects, there still has been room for improvement in simplification of the operations as a whole and enhancement of operational efficiency, for the mobile leakage detecting device to be frequently used for finding fine leak portions successively while moving around a wide range of searching area where piping and devices are in a complex arrangement.

The present invention has been made having regard to the state of the art noted above, and its primary object is to effectively achieve a simplification of the entire detecting operations including detection of the leak portion and operations incidental thereto, and enhancement of the operational efficiency thereof by providing a rational arrangement.

DISCLOSURE OF THE INVENTION

In order to achieve the above-noted object, a mobile leakage detecting device according to the present invention is characterized in the first place by a microphone for detecting ultrasonic waves generated at a fluid leak portion, input means for inputting positional information of the leak portion in a searching area detected based on output signals from the microphone, photograph means for photographing the leak portion, display means for indicating the positional information inputted by the input means and photographed image information of the leak portion obtained by the photograph means, and data processing means for relating with one another and storing the output data from the microphone, positional information inputted by the input means and photographed image information obtained by the photograph means on the same leak portion.

With this construction, the positional information is inputted by the input means and the leak portion is photographed by the photograph means thereby to record readily and precisely a position of the detected leak portion and peripheral conditions thereof for purposes of communicating with repair persons and reporting to administrators.

Also, the output data from the microphone (namely, detected ultrasonic wave data), positional information inputted by the input means and photographed image information obtained by the photograph means are related with one another by the data processing means to be stored. Therefore, it is avoided that the corresponding relationship between the collected data (the output data, inputted positional information and photographed image information) becomes uncertain, thereby to store the collected data easily and efficiently. Further, the above makes it easy to take out and use the collected data afterwards.

Furthermore, the positional information inputted by the input means and the photographed image information of the leak portion obtained by the photograph means may be displayed by the display means. Hence, in storing the inputted positional information and the photographed image information as the collected data, the operator may readily confirm on the spot by the display means whether the inputted positional information and the photographed image information are appropriate for grasping the position of the leak portion and the peripheral conditions thereof, or whether there are any input errors and/or improper photographing. As a result, the proper positional information and image information may be stored as the collected data to allow the operator to grasp the position of the leak portion and the peripheral conditions thereof more reliably after the inputted positional information and photographed image information are stored.

Thus, the above-noted construction makes it possible to effectively achieve simplification of the entire detecting operations including detection of the leak portion and accompanying operations thereof as well as enhancement of the operational efficiency.

It is preferable for the display means to indicate the positional information in the course of an inputting process to be monitored and the leak portion targeted to be photographed to be monitored in addition to indication of the inputted positional information and photographed image information of the leak portion.

The collected data including output data from the microphone, positional information inputted by the input means and photographed image information obtained by the photograph means may be stored in either the mobile leakage detecting device per se or a fixed device capable of receiving the data of the mobile device. The data processing means may be of any type as long as it relates the collected data on the same leak portion with one another in storing the data in the mobile leakage detecting device per se or the fixed device.

As the microphone, it is advantageous to use those having directionality. However, the microphone having no directionality may be used.

Where a directional microphone is used, a directional direction of the microphone and a photographing direction of the photograph means should be substantially parallel to each other in the same direction or should intersect in a predetermined position (determined by considering the sensitivity of the microphone and a photographing range of the photograph means, for example), whereby a position within a predetermined range in the directional direction of the microphone is photographed in a predetermined position such as the center of a display screen showing the photographed image information obtained by the photograph means. Further, a mark is provided in a position of the display means corresponding to the predetermined position, thereby to enable the operator to grasp clearly and easily the specific position of leakage photographed at the predetermined position on the display screen showing the image information.

Further, the mobile leakage detecting device according to the present invention having a second characteristic feature specifies another preferred embodiment for using the mobile leakage detecting device having the first characteristic feature as noted above. In addition to the first characteristic feature, the device further comprises specific-position marking means for providing a mark for indicating a specific leak position on a screen displayed by the display means showing the photographed image information of the leak portion obtained by the photograph means, wherein the data processing means relates and stores the position indicated on the screen by the mark provided by the specific-position marking means and the corresponding photographed image information.

With this construction, it is possible to provide a mark in a proper position accurately and easily by confirming the image information of the leak portion by the display means, since the mark for indicating the specific leak position is provided on the screen displayed by the display means showing the photographed image information of the leak portion obtained by the photograph means.

As a result, the position indicated by the mark on the screen is related with the corresponding photographed image information by the data processing means to be stored, thereby to allow the operator to grasp readily afterwards the position of the leak portion and the peripheral conditions thereof through the photographed image information (the image information obtained by photographing the leak portion in a rather wide range) and at the same time grasp the specific leak position clearly and easily on the screen showing the image information through the position indicated by the mark related with the image information and stored, which realizes the mobile leakage detecting device that is more excellent in functionality and convenience.

The mobile leakage detecting device according to the present invention having a third characteristic feature specifies a further preferred embodiment for using the mobile leakage detecting device having the first or second characteristic feature as noted above. In addition to the first and second characteristic features, the input means includes area map marking means for providing a mark for indicating a position of the leak portion on a screen displayed by the display means showing area map information of the searching area, and the data processing means relates and stores the position indicated on the screen by the mark provided by the area map marking means, as the positional information, and the output date from the microphone and photographed image information obtained by the photograph means on the same leak portion.

With this construction, it is possible to provide a mark for indicating the position of the leak portion in a proper position accurately and easily as well as the mark for indicating the specific leak position as noted above by confirming the area map information in the searching area by the display means, since the mark for indicating the position of the leak portion is provided on the screen displayed by the display means showing the area map information in the searching area.

As a result, the position indicated by the mark on the screen is related, as the positional information to be stored, with the output data from the microphone and photographed image information obtained by the photograph means on the same leak portion. Thus, the operator may afterwards grasp readily the position of the leak portion and the peripheral conditions thereof by the image information of the leak portion and at the same time grasp the position of the leak portion in the searching area (namely, the position of the leak portion shown in a scene with a reduced scale compared with the image information of the leak portion) clearly and easily on the screen showing the area map information through the stored position indicated by the mark. In these respects, it is possible to realize the mobile leakage detecting device which is more excellent in functionality and convenience.

The mobile leakage detecting device according to the present invention having a fourth characteristic feature specifies a still further preferred embodiment for using the mobile leakage detecting device having the third characteristic feature as noted above. In addition to the third characteristic feature, the device further comprises area map information storage means for storing the photographed image information of the searching area obtained by the photograph means as the area map information used for marking by the area map marking means.

With this construction, the operator may input the image information in the searching area utilizing the photograph means for photographing the leak portion, as a result of which the number of required components may be reduced compared with the device for inputting the image information in the searching area through separate dedicated image information input means. Further, the entire device is easy to handle and the manufacturing cost can be reduced. Also, the input operation per se of the image information of the searching area may be simplified by inputting the image information of the searching area utilizing the photograph means for photographing the leak portion carried by the operator when starting a series of detecting operations.

The mobile leakage detecting device according to the present invention having a fifth characteristic feature specifies a still further preferred embodiment for using the mobile leakage detecting device having the first to fourth characteristic features as noted above. In addition to the first to fourth characteristic features, the input means includes positional data selecting means for allowing the operator to select data corresponding to the detected leak portion from a plurality of positional data indicated in the display means, and wherein said data processing means relates and stores the positional data selected by the positional data selecting means, as the positional information, and the output data from the microphone and photographed image information obtained by the photograph means on the same leak portion.

With this construction, the operator may input the positional information of the leak portion easily and simply by selecting the data corresponding to the detected leak portion from the plurality of positional data indicated on the display means. As a result, it is possible to achieve more effectively simplification of the entire detecting operations including detection of the leak portion and incidental operations thereof as well as enhancement of the operational efficiency.

The mobile leakage detecting device according to the present invention having a sixth characteristic feature specifies a still further preferred embodiment for using the mobile leakage detecting device having the fifth characteristic feature as noted above. In addition to the fifth characteristic feature, the device further comprises positional data storage means for storing the positional data used for data selection by the positional data selecting means to be rewritable by editing means.

With this construction, prior to the series of detecting operations, the positional data used for data selection by the positional data selecting means is rewritable with an area to be searched and a type of a leak portion to be detected. This facilitates the input operation of the positional information by selecting the positional data, and yet allows the operator to input the information required for the area to be searched and the type of the leak portion to be detected as the positional information of the leak portion. In these respects, it is possible to realize the mobile leakage detecting device which is more excellent in functionality, convenience and versatility.

Further, the mobile leakage detecting device according to the present invention having a seventh characteristic feature is characterized by a microphone for detecting ultrasonic waves generated at a fluid leak portion, display means for indicating area map information of a searching area, area map marking means for providing a mark for indicating a position of the leak portion in the searching area detected based on output signals from the microphone in a screen displayed by the display means, and data processing means for relating and storing the output data from the microphone and the position indicated on the screen by the mark provided by the area map marking means on the same leak portion.

More particularly, similarly to the mobile leakage detecting device having the third characteristic feature as noted above, it is possible to provide the mark for indicating the position of the leak portion in a proper position accurately and easily by confirming the area map information in the searching area by the display means, since the mark is provided on the screen displayed by the display means showing the area map information in the searching area.

Also, the position indicated on the screen by the mark is stored as the positional information of the detected leak portion, which enables repair persons and/or administrators to grasp afterwards the position of the leak portion in the searching area clearly and easily on the area map information screen through the stored position indicated by the mark.

Further, the output data from the microphone and the position indicated on the screen by the mark on the same leak portion are related with each other by the data processing means to be stored. Thus, it can be avoided that the corresponding relationship between the collected data (the output data and position indicated by the mark) becomes uncertain when the device is used in detecting a plurality of leak portions successively which are present in the searching area. As a result, the collected data can be stored efficiently and easily. The collected data can be also taken out and used easily afterwards.

From this, the above-noted construction can efficiently achieve simplification of the entire detecting operations including detection of the leak portion and operations incidental thereto as well as enhancement of the operational efficiency.

In this connection, the collected data including output data from the microphone and the position indicated by the mark may be stored in either the mobile leakage detecting device per se or a fixed device capable of receiving the data from the mobile device. The data processing means may be of any type as long as it relates the collected data on the same leak portion with one another in storing the data in the mobile leakage detecting device per se or the fixed device.

The mobile leakage detecting device according to the present invention having an eighth characteristic feature specifies a further preferred embodiment for using the mobile leakage detecting device having the seventh characteristic feature as noted above. In addition to the seventh characteristic feature, the device comprises area map information storage means for storing either photographed image information of the searching area obtained by photograph means, image information of the searching area taken in from a scanner, or image information of the searching area taken out of an image storage medium as the area map information used for marking by the area map marking means.

With this construction, the operator may input the image information of the searching area either by photographing the area by the photograph means, taking in the image information from the scanner, or taking out the image information from the image storage medium. Thus, the input operation of the image information of the searching area can be simplified compared with the device for producing the area map information which is usable for marking by the area map marking means each through photograph means prior to the series of detecting operations, for example. This will achieve effectively simplification of the entire detecting operations as well as enhancement of the operational efficiency.

In using the mobile leakage detecting device having the eighth characteristic feature as noted above, a more convenient mobile leakage detecting device may be realized if the device is capable of inputting the image information of the searching area in any of the two or more ways of photographing the area by the photograph means, taking in the image from the scanner, and taking out the image from the image storage medium.

In this connection, either wired or wireless communicating means may be employed to transmit the photographed image information of the searching area obtained by the photograph means, the image information of the searching area taken in from the scanner, or the image information of the searching area taking out of the image storage medium to the area map information storage means. Communication lines such as the Internet may also be utilized.

The mobile leakage detecting device according to the present invention having a ninth characteristic feature specifies a further preferred embodiment for using the mobile leakage detecting device having the first to eighth characteristic features as noted above. In addition to the first to eighth characteristic features, the device comprises computing condition data selecting means for allowing the operator to select data corresponding to the detected leak portion from computing condition data indicated on the display means, and computing means for computing an amount of fluid leakage in the corresponding leak portion based on the output data from the microphone and the data selected by the computing condition data selecting means on the same leak portion.

With this construction, the operator may determine, by the amount of the fluid leakage in each leak portion obtained by calculation through the computing means, a degree of progress of leakage, urgency for repair, and an economic loss and/or influences upon the associated facilities resulting from the fluid leakage, which cannot be determined simply by finding the leak portion through detection of ultrasonic waves. In this respect, the mobile leakage detecting device which is more excellent in functionality and convenience may be realized.

Further, the operator may easily input the computing conditions simply by selecting the data corresponding to the detected leak portion from the plural computing condition data or a single computing condition datum indicated by the display means. This will achieve effectively simplification of the entire detecting operations including detection of the leak portion and operations incidental thereto while providing excellent functionality and convenience in determining the nature of the fluid leakage as noted above.

The mobile leakage detecting device according to the present invention having a tenth characteristic feature specifies a further preferred embodiment for using the mobile leakage detecting device having the ninth characteristic feature as noted above. In addition to the ninth characteristic feature, the device comprises computing condition data storage means for storing the computing condition data used for data selection by the computing condition data selecting means to be rewritable by editing means.

With this construction, prior to the series of detecting operations, the computing condition data used for data selection by the computing condition data selecting means is rewritable with an area to be searched and a type of a leak portion to be detected. This facilitates the input operation of the computing conditions by selecting the computing condition data, and yet allows the operator to input the conditions required for the area to be searched and the type of the leak portion to be detected as the computing conditions for computing the amount of fluid leakage. As a result, the accuracy of computing the amount of fluid leakage is also increased. In these respects, it is possible to realize the mobile leakage detecting device which is more excellent in functionality, convenience and versatility.

The mobile leakage detecting device according to the present invention having an eleventh characteristic feature is characterized by a plurality of directional microphones for detecting ultrasonic waves generated in a leak portion, the microphones being dispersedly provided in the same direction in vertex portions of a polygon such that directional ranges for the respective microphones may have common overlapping portions, and a light source provided inwardly of the polygon as viewed from a directional direction of the microphones for emitting a light beam to the common overlapping portions of the directional ranges of the microphones.

With this construction, the light beam is emittable to the leak portion to be detected based on the output signals from the plurality of directional microphones. Thus, the operator may clearly visually confirm the point irradiated by the light beam as the portion to be detected at that point thereby to find the leak portion based on the output signals from the plural microphones in detecting the leak portion based on the output signals from the microphones while changing a position of the device having the microphones and light source for emitting the light beam to shift the directional direction of the plural microphones. As a result, the operator may detect the leak portion efficiently and easily compared with the device for detecting the leak portion only based on the output signals from the microphones.

Further, the position of the leak portion is precisely and easily recorded by utilizing the point irradiated by the light beam with a method of providing a mark in the detected leak portion based on a clear visual confirmation of the leak portion by viewing the point irradiated by the light beam, or a method of photographing the detected leak portion and the point irradiated by the light beam by the photograph means.

Moreover, the plurality of directional microphones are dispersedly provided in the same direction in the vertex portions of the polygon such that the directional ranges for the respective microphones may have the common overlapping portions, and the light source is provided inwardly of the polygon as viewed from the directional direction of the microphones for emitting the light beam to the common overlapping portions (namely, the portions having the highest sensitivity in detecting ultrasonic waves by the plural microphones) of the directional ranges of the microphones. This will effectively increase the corresponding accuracy between the leak portion detected based on the output signals from the plural microphones (namely, the portion where the ultrasonic wave values detected by the plural microphones are at a peak) and the point irradiated by the light beam. This can more effectively promote simplification of detection of the leak portion and simplification of recording the position utilizing the light beam as noted above.

From this, the above-noted construction may effectively achieve simplification of the entire detecting operations including detection of the leak portion and operations incidental thereto as well as enhancement of the operational efficiency. When the device having the eleventh characteristic feature is used in combination with any of the first to tenth characteristic features as noted above, simplification of the entire detecting operations and enhancement of the operational efficiency may be achieved much more effectively.

The plural microphones dispersedly provided in the vertex portions of the polygon in the same direction are not necessarily arranged strictly in parallel as long as the common overlapping portions are produced in the directional ranges of the microphones. Instead, each microphone may be inclined somewhat inwardly or outwardly.

In dispersedly providing the plural microphones in the vertex portions of the polygon and providing the light source inwardly of the polygon for emitting the light beam, it is preferable to arrange the microphones at vertex portions of a regular polygon and arrange the light source adjacent the center of gravity of the regular polygon as viewed from the directional direction of the microphones. However, the arrangement of these elements is not limited to this form.

BEST MODE FOR CARRYING OUT THE INVENTION

Figure 1:
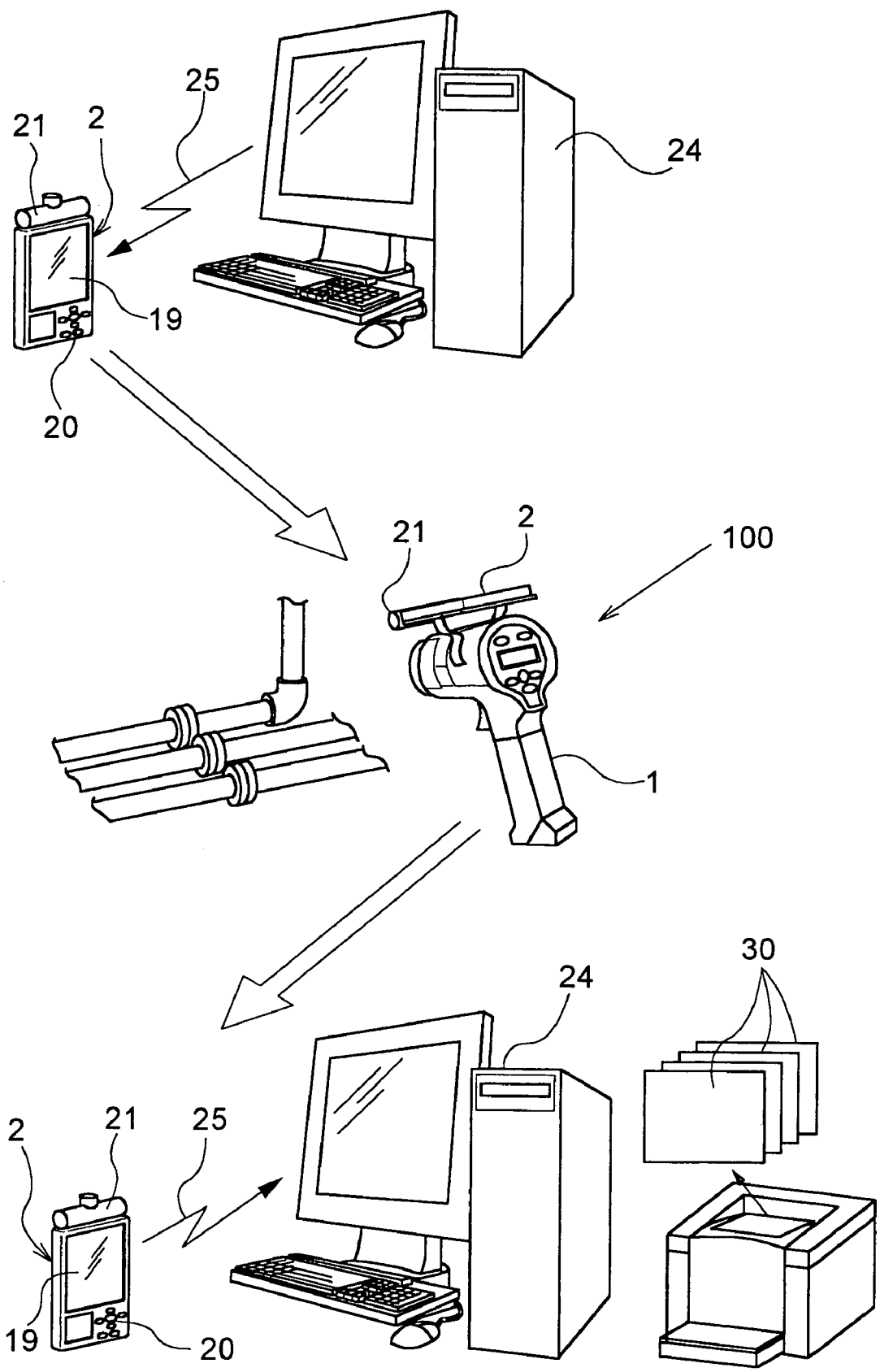
FIG. 1 shows a flow of detecting operations.
Figure 2:
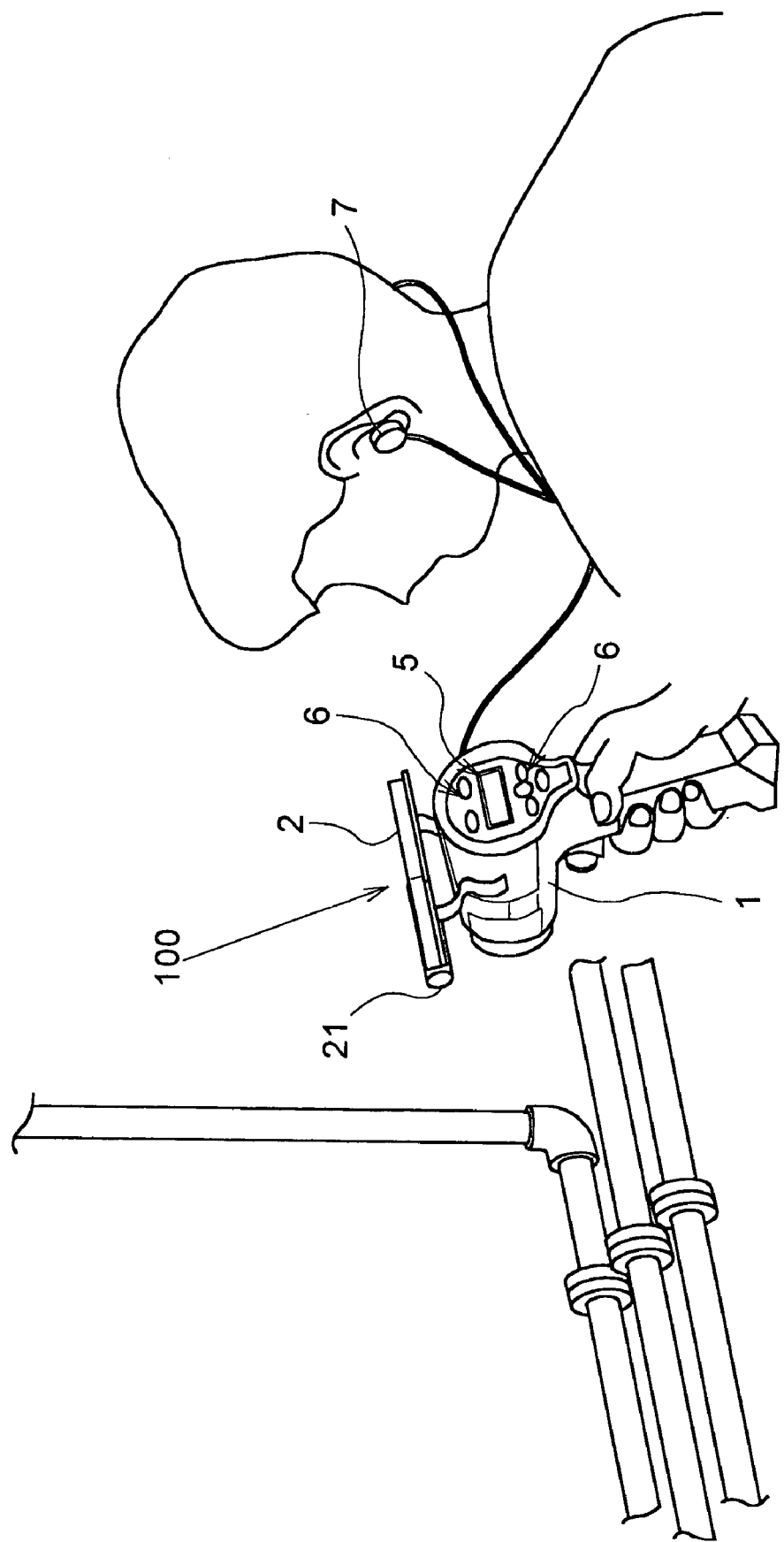
FIG. 2 shows a condition for detecting a leak portion.

Referring to FIGS. 1 and 2, numeral 100 denotes a mobile leakage detecting device including a gun-like portable detector 1 acting as a main component, and a portable computer 2 attached to the portable detector 1.

Figure 3:
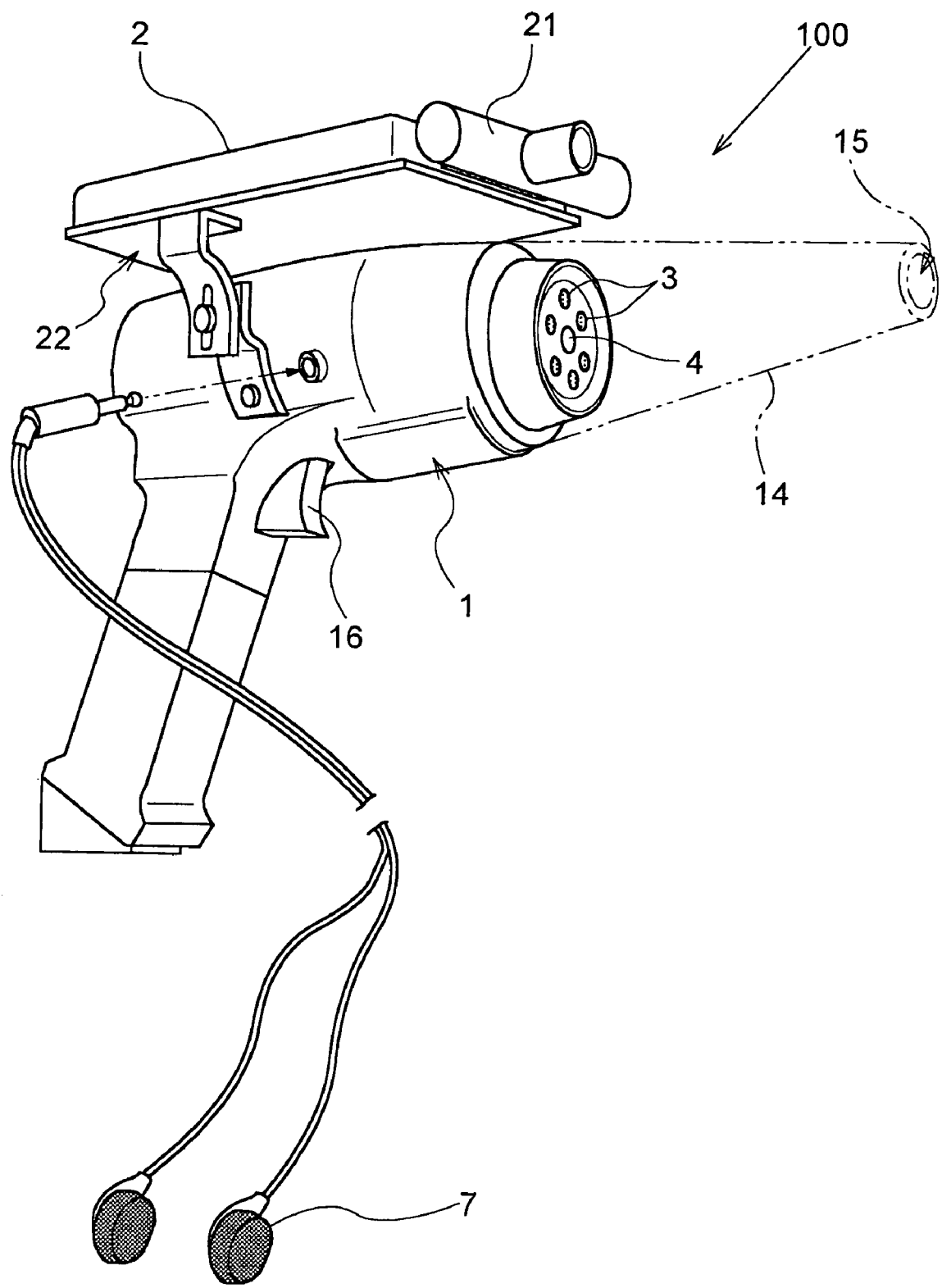
FIG. 3 is a perspective view of a device.
Figure 4:
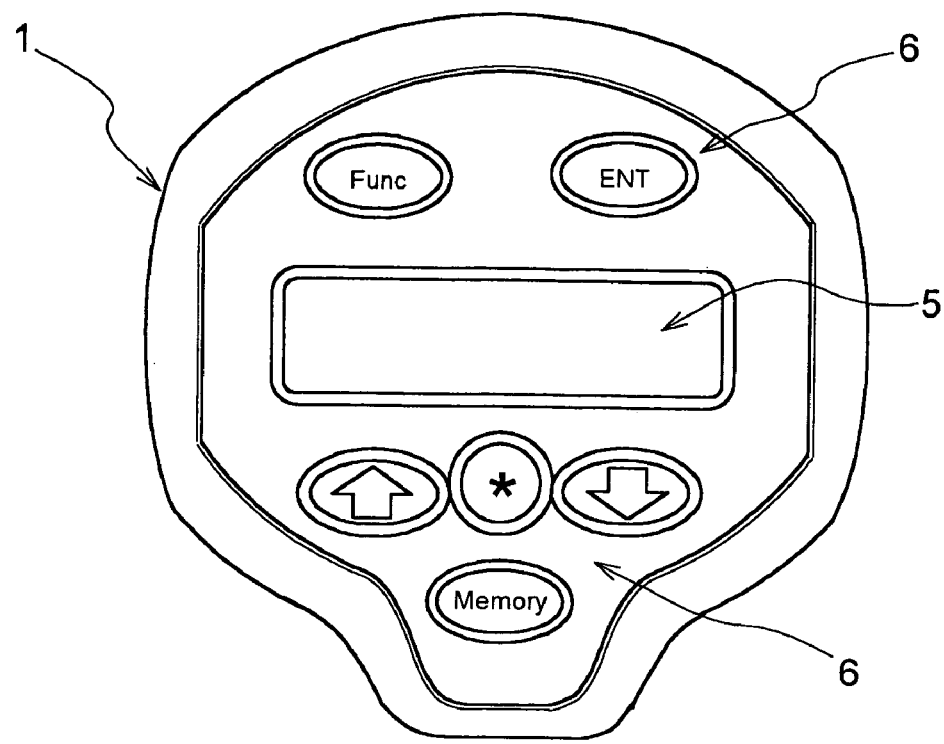
FIG. 4 is an enlarged view of a portable detector at a rear end thereof.

As illustrated in FIGS. 3 and 4, the portable detector 1 has at a front end thereof directional microphones 3 for detecting ultrasonic waves generated at a fluid leak portion and a light source 4 for emitting a light beam, and at a rear end thereof a display 5 for indicating detected ultrasonic wave values (specifically, sound pressures of detected ultrasonic waves) in bar-graphic representation and digital representation, and various keys 6. The portable detector 1 also has an earphone 7 connected thereto for outputting detection sounds made audible from the detected ultrasonic waves.

As the directional microphones 3, microphones having directionality themselves, or microphones having directionality by providing tubular members around a sound-sensitive portion may be used.

Figure 17:
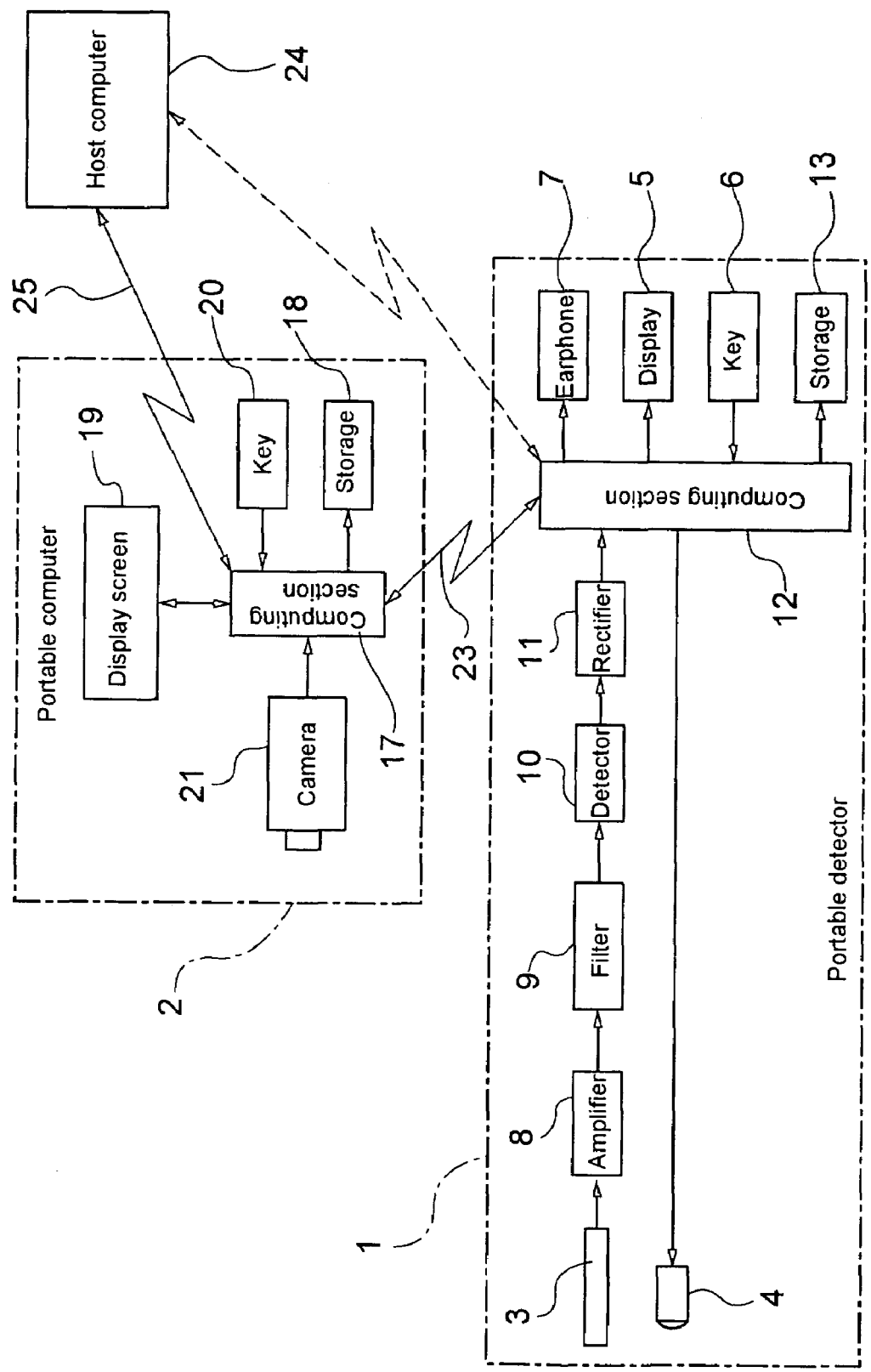
FIG. 17 is a block diagram of the device.

As illustrated in FIG. 17, the portable detector 1 includes a computing section 12 for indicating detected ultrasonic wave values on the display 5 based on inputted signals outputted from the microphones 3 through an amplifier section 8, a filter section 9, a wave detecting section 10 and a rectifier section 11 and also for outputting the detection sounds made audible to the earphone 7, and a storage section 13 for storing various data.

Figure 5:
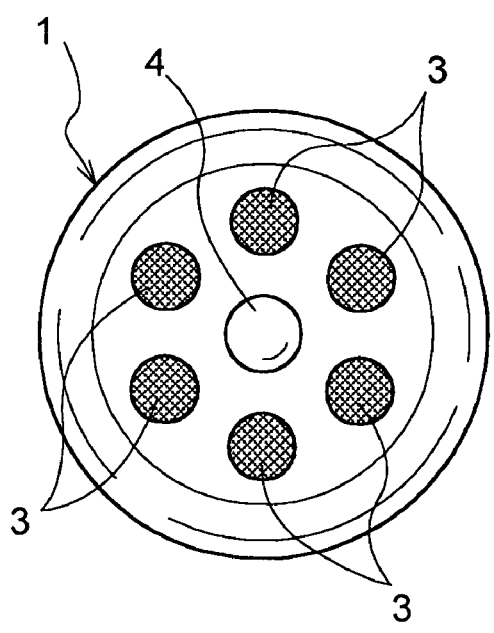
FIG. 5 is an enlarged view of the portable detector at a front end thereof.
Figure 6:
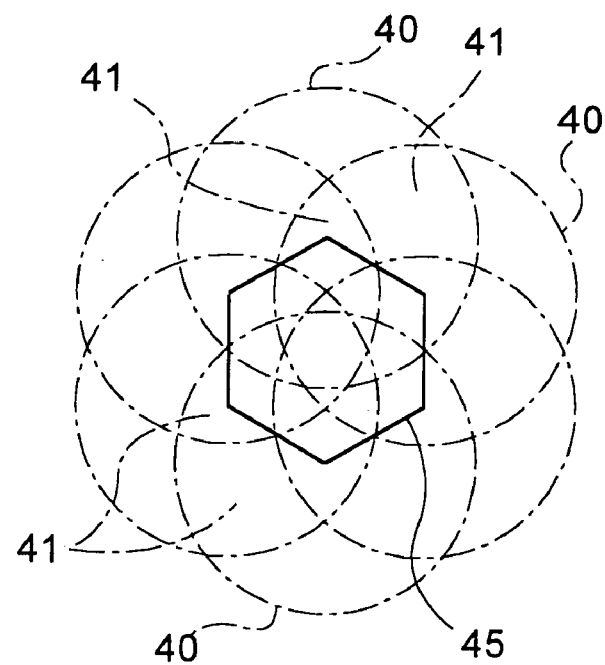
FIG. 6 shows a condition of directional ranges.

As shown in FIGS. 5 and 6, a plurality of microphones 3 are dispersedly provided in the same direction in vertex positions of a regular polygon 45 (a regular hexagon in this embodiment) such that directional ranges 40 of the microphones may have common overlapping portions 41. On the other hand, the light source 4 for emitting a light beam is provided at the center of gravity of the regular polygon 45 as viewed from a directional direction of the microphones such that the light beam is emitted to the common overlapping portions 41 of the directional ranges 40 of the microphones. Thus, as shown in FIG. 2, the operator, in locating a leak position based on detected ultrasonic wave values outputted and detection sounds while changing the direction of the front end of the portable detector 1 to shift the directional direction of the microphones 3, may observe points irradiated by the light beam to clearly and visually confirm searched positions at one point after another, thereby to find a leak position.

Ultrasonic wave detecting sensitivity (namely, a degree of signal amplification in the amplifier section 8) may be determined and varied by operating the keys 6. The sensitivity determined is indicated on the display 5 together with the detected ultrasonic wave values. By operating the keys 6 when the leak portion is detected, the computing section 12 relates the ultrasonic wave value detected at the leak portion as output data from the microphones at the leak portion to the determined sensitivity at that time by utilizing an management number assigned to the leak portion, and stores the value in the storage section 13 along with the determined sensitivity.

Numeral 14 denotes a conical cap having a small opening 15 formed at a distal end thereof. When a possible leak portion is detected, the cap 14 is attached to the front end of the portable detector 1 as appropriate to increase the directionality of the plural microphones 3 as a whole. Then the detector is moved close to the leak portion to confirm it by the detected ultrasonic wave value and the detection sound at that time.

Numeral 16 denotes a power switch operable in a trigger-like manner. As the power switch 16 is turned ON, an ultrasonic waves detecting condition is established. ON/OFF operations for emitting the light beam are effected through the keys 6.

The portable computer 2 includes a computing section 17, a storage section 18, a display screen 19, various keys 20, and a small digital camera 21 attachable thereto, as illustrated in FIGS. 1 and 17. The portable computer 2 is detachably attached to a top of the portable detector 1 to be positionally adjustable through an attaching element 22, and is also capable of communication with the portable detector 1 through wired or wireless communicating means 23.

In a detecting operation, a searching area (part of an area in a factory or a plant, for example) is photographed by the camera 21 attached to the portable computer 2 first, and then photographed area map information 61 (such as images shown in FIGS. 14 and 15) is stored in the storage section 18 of the portable computer 2.

After that, as shown in FIG. 2, the operator searches a leak portion based on the detected ultrasonic wave values and the detection sounds by using the portable detector 1 while moving around the searching area. When a leak portion is detected, the ultrasonic wave value detected at that leak portion is stored in the storage section 13 of the portable detector 1 by operating the keys 6 as noted above.

Figure 7:
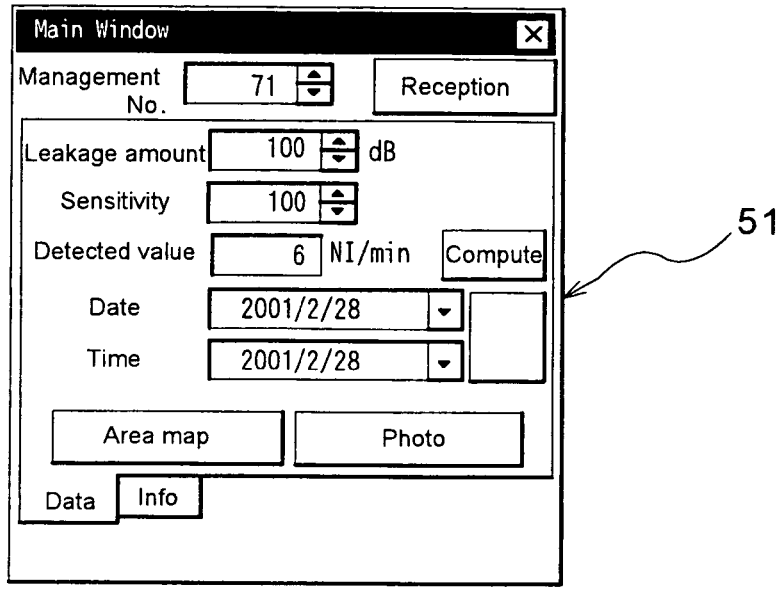
FIG. 7 shows a data input screen.

After the storing operation, the computing section 12 of the portable detector 1 calls up the computing section 17 of the portable computer 2. In response, the computing section 17 of the portable computer 2 reads the detected ultrasonic wave value and the predetermined sensitivity related to each other by a management number and stored in the storage section 13 of the portable detector 1, and displays a data input screen 51 on the display screen 19 as illustrated in FIG. 7 to indicate the management number, detected ultrasonic wave value, predetermined sensitivity and date and time of detection on the leak portion in the data input screen 51.

Figure 10:
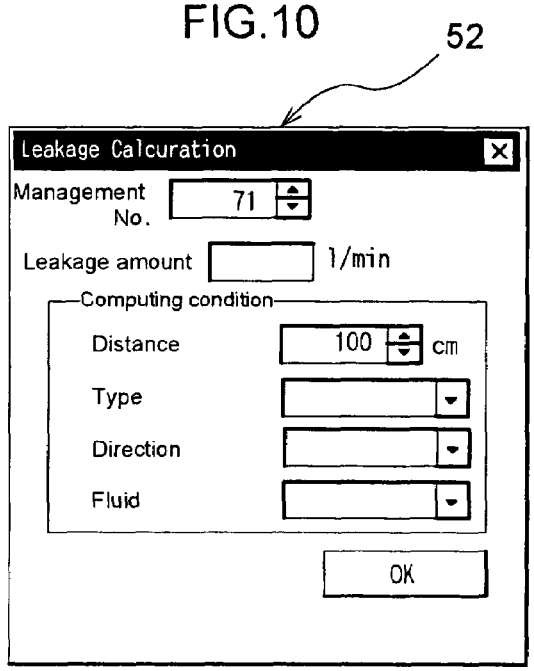
FIG. 10 shows a screen for inputting calculation conditions.
Figure 11:
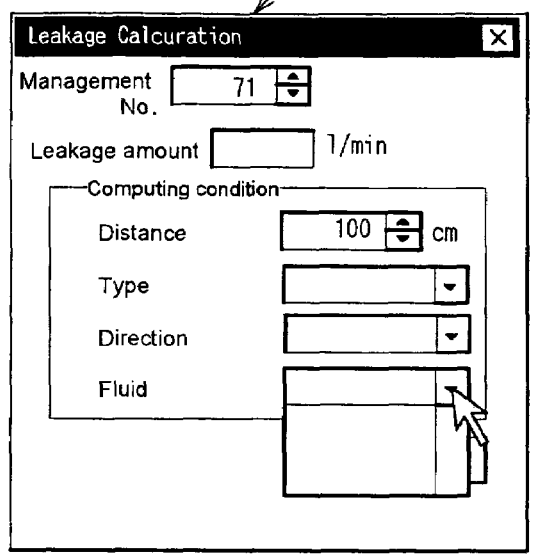
FIG. 11 shows a screen for inputting calculation conditions.

As a calculation of an amount of leakage is instructed by operating the keys 6 on the data input screen 51, the computing section 17 displays a computing condition input screen 52 on the display screen 19 as shown in FIGS. 10 and 11. When computing conditions on the leak portion are inputted for items such as a distance, type, direction and fluid on the computing condition input screen 52, the computing section 17 calculates the amount of leakage of the fluid at that leak portion based on the ultrasonic wave value detected at the leak portion and the inputted computing conditions, and indicates the calculated amount of leakage in the computing condition input screen 52.

With respect to the above-noted items, the distance means a distance of space between a leak point and the detector 1, the type means a type of a piping member or the like having the leak portion, the direction means a detecting direction of the ultrasonic wave relative to the leak point, and the fluid means a type of leaking fluid.

In inputting conditions on the computing condition input screen 52, when a list indication for the type, direction and fluid is instructed by key operation on the screen 52, the computing section 17 indicates a list of computing condition data (pulldown menu) on the screen 52 for each item individually as shown in FIG. 11. As the computing condition data corresponding to the detected leak portion is selected from the list, the computing section 17 carries out the above-noted calculation, regarding the selected data as the inputted computing conditions.

The computing condition data shown in the list is prepared by utilizing a dedicated program in a host computer 24 prior to a series of detecting operations, transmitted from the host computer 24 to the portable computer 2 through wired or wireless communicating means 25 as shown in FIG. 1, and then stored in the storage section 18 of the portable computer 2. Such data is rewritable as appropriate by similar operations in accordance with an area to be searched or type of a leak portion to be detected.

A function of computing an amount of leakage is provided also for the portable detector 1 so as to carry out a calculation of an amount of leakage when the portable computer 2 is removed from the portable detector 1 to solely use the detector 1 for detecting the leak portion. In storing the detected ultrasonic wave value in the storage section 13 of the portable detector 1, the operator inputs computing conditions for the respective items by operating the keys 6 while confirming the inputted data on the display 5. Then, the computing section 12 of the portable detector 1 calculates the amount of fluid leakage based on the detected ultrasonic wave value and the inputted computing conditions. The calculated amount of leakage is indicated on the display 5 and related to the detected ultrasonic wave value and the predetermined sensitivity based on the management number assigned to the corresponding leak portion to be stored in the storage section 13.

When the amount of leakage is calculated in the portable detector 1 as noted above with the portable computer 2 being attached to the portable detector 1, the computing section 17 of the portable computer 2 reads the detected ultrasonic wave value and the predetermined sensitivity stored in the storage section 13 of the portable detector 1 together with the calculated amount of leakage. The amount of leakage calculated in the portable computer 2 or detector 1 is indicated on the data input screen 51 along with the management number assigned to the leak portion, detected ultrasonic wave value, predetermined sensitivity and data and time of detection.

Figure 8:
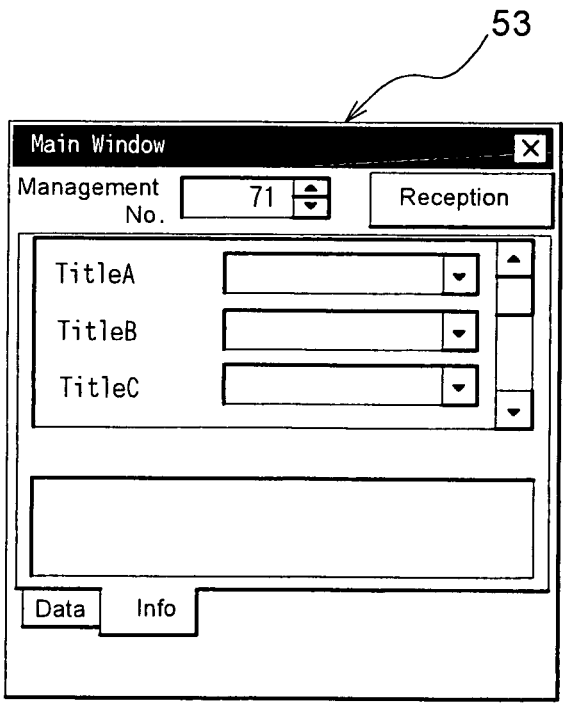
FIG. 8 shows a screen for inputting positional information.
Figure 9:
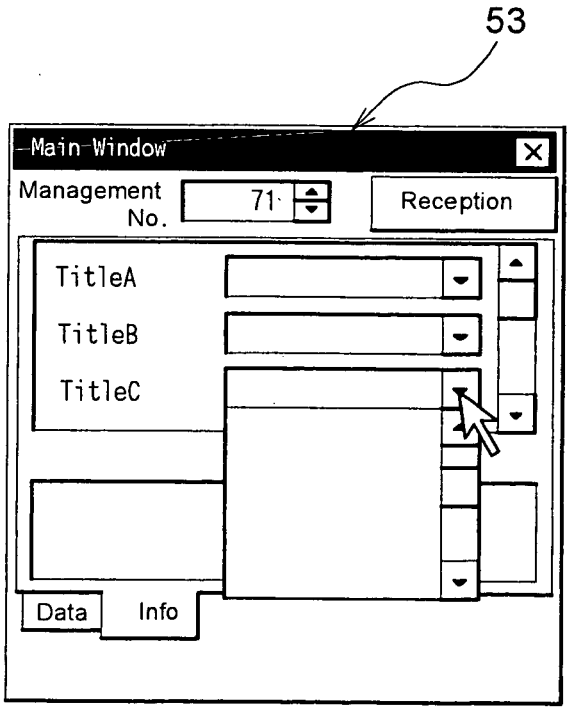
FIG. 9 shows a screen for inputting positional information.

When indication of a positional information input screen is instructed on the data input screen 51 by key operation, the computing section 17 displays the positional information input screen 53 on the display screen 19 as shown in FIGS. 8 and 9. On the positional information input screen 53, positional information on the leak portion is inputted for respective items A, B and C (described as "Title A", "Title B" and "Title C" in the drawings). As indication of the lists is instructed for the respective items A, B and C on the positional information input screen 53 by key operation when the information is inputted on the screen 53, the computing section 17 indicates the list for positional data (pulldown menu) on the screen 53 for each item individually as shown in FIG. 9. When the positional data for the corresponding leak portion is selected from the list, the computing section 17 regards the selected data as the inputted positional information on the leak portion.

The positional data in the list and the names of the respective items A, B and C are prepared by utilizing the dedicated program in the host computer 24 prior to the series of detecting operations in the same manner as the computing condition data, and stored in the storage section 18 of the portable computer 2. Such data is rewritable as appropriate by similar operations in accordance with an area to be searched or type of a leak portion to be detected.

It is possible to use positional coordinate information of the leak portion, and names of a factory, facility and section where the leak portion is present, as the positional date in the lists.

Figure 14:
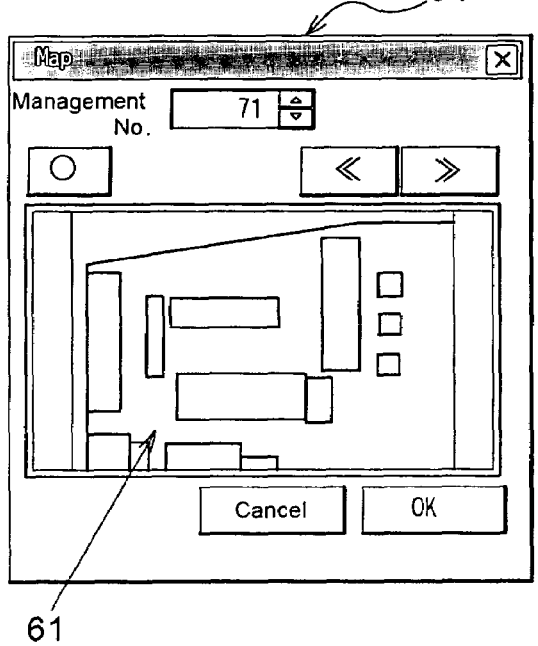
FIG. 14 shows a screen indicating an area map.
Figure 15:
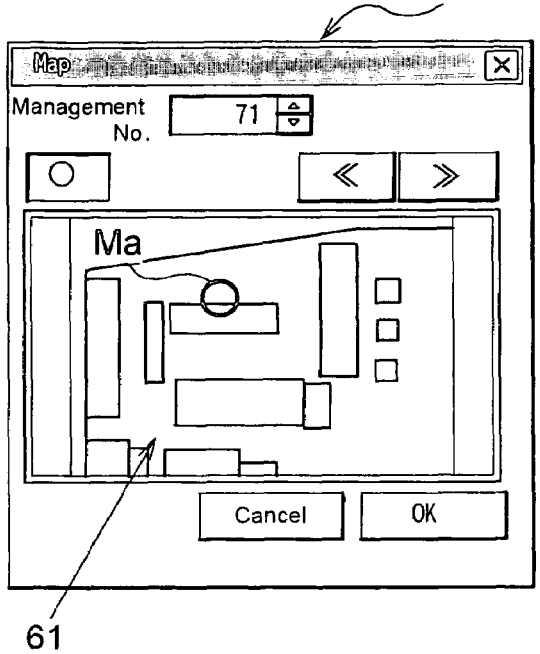
FIG. 15 shows a screen indicating an area map.

Further, when an indication of the area map is instructed on the data input screen 51 by key operation on the screen 51, the computing section 17 displays an area map screen 54 on the display screen 19 as shown in FIGS. 14 and 15 to indicate the area map information 61 stored in the storage section 18 on the area map screen 54. Then, when a marking operation is effected for indicating a position of the leak portion in the indicated area map information 61 according to a predetermined procedure, the computing section 17 provides a mark Ma (a circle with the indicated position located at the center thereof in this embodiment) in the indicated area map information 61 as shown in FIG. 15.

The marking operation may be an operation to indicate the position of the leak portion by moving a pointer to that position on the display screen 19 through a key operation, or an operation to indicate the position of the leak portion on the display screen 19 designed as the touch panel type by touching that position on the screen with a pen or the like.

Figure 12:
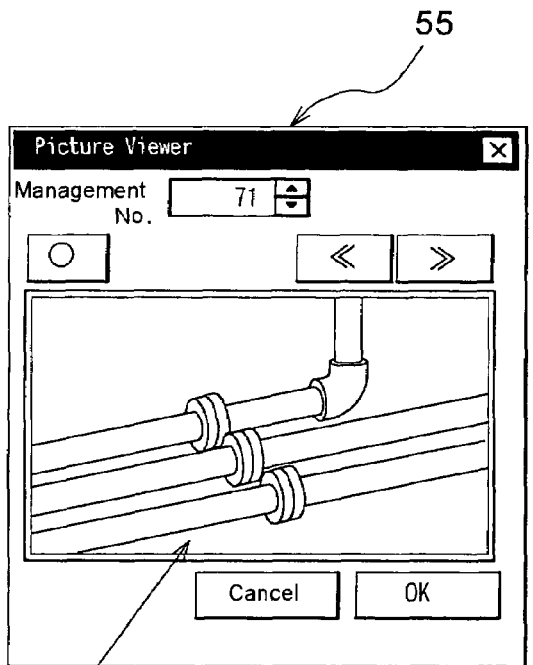
FIG. 12 shows a screen indicating photographed image information.
Figure 13:
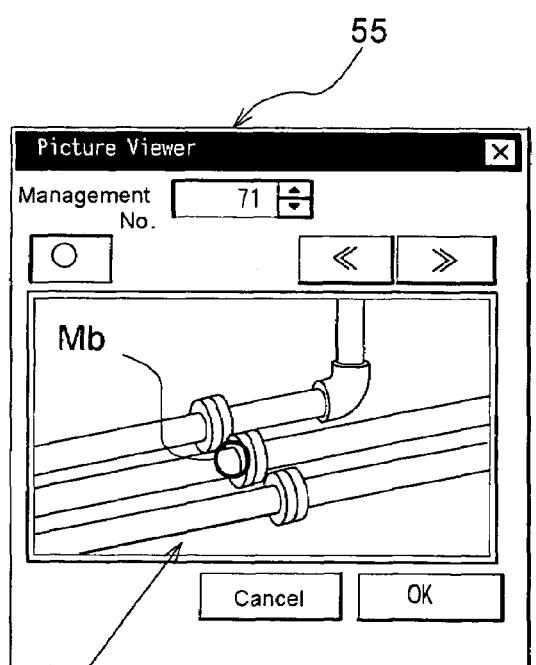
FIG. 13 shows a screen indicating photographed image information.

In a similar manner, when, after the leak portion is photographed by the camera 21 attached to the portable computer 2, an indication of the photographed image information is instructed in the data input screen 51 by key operation on the screen 51, the computing section 17 displays a photographed image information screen 55 on the display screen 19 as shown in FIGS. 12 and 13 to indicate image information 62 of the leak portion on the photographed image information screen 55. Then, when a marking operation for indicating a specific position of the leak portion is carried out in the indicated photographed image information 62 according to a predetermined procedure, the computing section 17 provides a mark Mb (a circle with the indicated position located at the center thereof in this embodiment) in the indicated photographed image information 62 as shown in FIG. 13.

When the input operations are completed on the respective screens 51 through 55 as noted above, the computing section 17 relates the detected ultrasonic wave value, predetermined sensitivity, amount of leakage, date and time of detection, inputted positional information, inputted computing conditions, position indicated by the mark Ma in the indicated area map information 61, photographed image information 62, and position indicated by the mark Mb in the indicated image information 62 of the leak portion with one another based on the management number assigned to the leak portion, and stored in the storage section 18.

More particularly, when detecting leak portions successively while moving around the searching area, the operator may carry out the above-noted operations for each leak portion to store the collected data on each leak portion (the detected ultrasonic wave value, predetermined sensitivity, amount of leakage, date and time of detection, inputted positional information, inputted computing conditions, position indicated by the mark Ma, photographed image information 62, and position indicated by the mark Mb on the same leak portion related to one another by the management number of each leak portion) in the storage section 18 of the portable computer 2.

Figure 16:
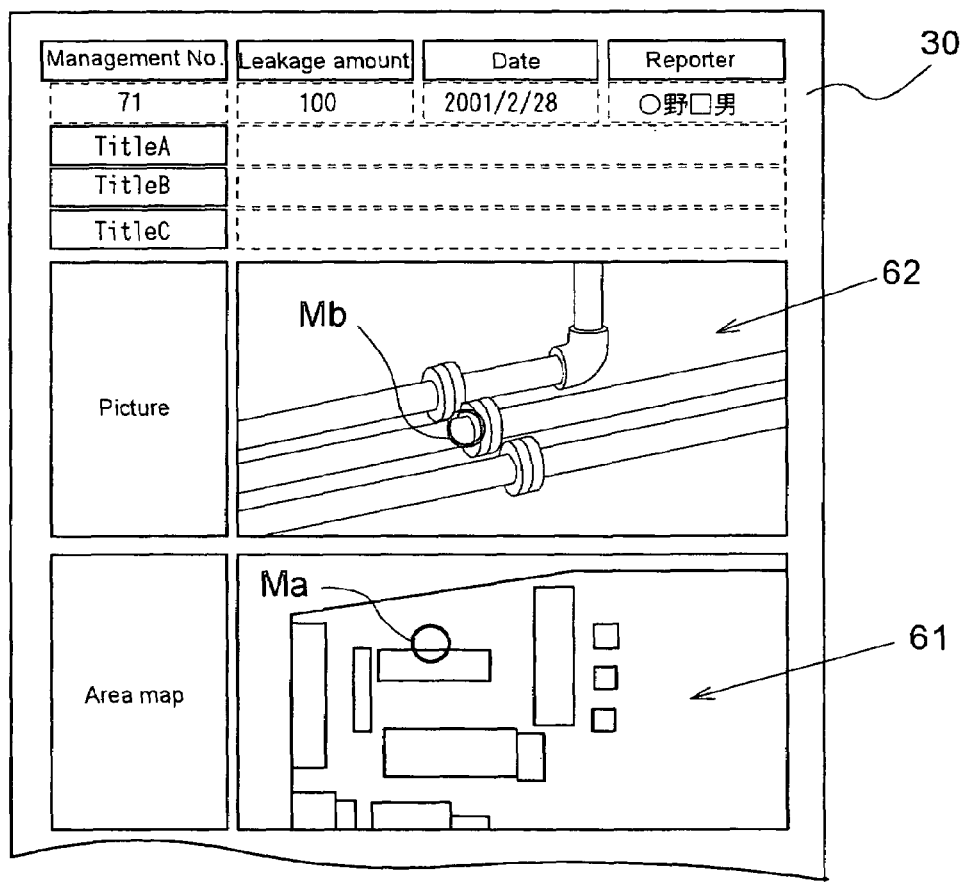
FIG. 16 shows a report.

Upon completion of the series of detecting operations, a group of collected data stored in the storage section 18 of the portable computer 2 is taken out to the host computer 24 through the wired or wireless communicating means 25 as shown in FIG. 1 in a manner similar to the writing of the computing condition data and positional data. By utilizing the dedicated program at the host computer 24, a report 30 (report 30 concerning each leak portion including the area map information 61 with the mark Ma and the leak portion image 62 with the mark Mb as well as document data such as the detected ultrasonic wave value, amount of leakage, date and time of detection, the leak portion positional information and the like shown in a predetermined format) is produced as shown in FIG. 16.

The portable detector 1 is also capable of communication with the host computer 24 by wire or wireless when it is solely used, which enables the operator to directly take out the collected data stored in the storage section 13 of the portable detector 1 to the host computer 24 and to write various data in the storage section 13 of the portable detector 1 directly from the host computer 24.

As set forth above, in the present embodiment, the camera 21 attached to the portable computer 2 serves as the photograph means for photographing the leak portion, while the display screen 19 of the portable computer 2 serves as display means for indicating the positional information inputted from input means and the photographed image information 62 of the leak portion obtained by the photograph means.

The computing section 17 of the portable computer 2 executes a predetermined program thereby to function as specific-position marking means for providing the mark Mb for indicating the specific leak point on the screen displayed by the display means for showing the photographed image information 62 of the leak portion obtained by the photograph means. The computing section also functions as area marking means for providing the mark Ma for indicating the position of the leak portion on the screen displayed by the display means for showing the area map information 61 of the searching area, and further functions as positional data selecting means for allowing the operator to select appropriate data corresponding to the detected leak portion from a plurality of positional data indicated by the display means. The area marking means and positional data selecting means constitute the above-described input means for inputting the positional information of the leak portion detected based on the output signals from the microphones 3.

Also, the computing section 17 of the portable computer 2 executes a predetermined program thereby to function as computing condition data selecting means for allowing the operator to select appropriate data corresponding to the detected leak portion from a plurality of computing condition data or a single computing condition data indicated by the display means, and further function as computing means for computing an amount of fluid leakage in the corresponding leak portion based on the output data from the microphones and data selected by the computing condition data selecting means on the same leak portion.

Further, the computing section 17 of the portable computer 2 executes a predetermined program thereby to function as data processing means for relating the output data from the microphones, photographed image information 62 obtained by the photograph means, positional data selected by the positional data selecting means (inputted positional information), indicated position shown on the screen and provided with the mark Ma by the area map marking means (inputted positional information), indicated position shown on the screen and provided with the mark Mb by the specific-position marking means, and amount of fluid leakage computed by the computing means with one another to store them.

Still further, the computing section 17 of the portable computer 2 executes a predetermined program thereby to function as area map information storage means for storing photographed image information on the searched area obtained by the photograph means in the storage section 18 as the area map information 61 used for marking by the area map marking means. The computing section further functions as positional data storage means for storing the positional data used for data selection by the positional data selecting means in the storing section 18 to be rewritable by an editor, and further functions as computing condition data storage means for storing the computing condition data used for data selection by the computing condition data selecting means in the storage section 18 to be rewritable by the editor.

The host computer 24 capable of communication with the portable computer 2 through the communicating means 25 executes a predetermined program thereby to function as the editor for rewriting the positional data used for data selection by the positional data selecting means and the computing condition data used for data selection by the computing condition selecting means. It is to be noted that the editor function may be assigned to the computing section 17 of the portable computer 2.

OTHER EMBODIMENTS

Next, modified embodiments of the present invention will be listed below.

The photograph means is not limited to the ordinary small digital camera, but may be a video camcorder, a camera such as an infrared camera used for scotopic photography and a camera such as an X-ray camera for fluoroscopic photography. Further, any additional components may be provided for the photograph means such as a flashbulb and a lighting device for illuminating a dark leak portion.

In the foregoing embodiment, the portable computer 2 with the display means and photograph means is detachably attached to the portable detector 1. Instead, one or both of the display means and photograph means may be formed integrally with the portable detector 1, or may be separated from but capable of communication with the portable detector 1 by wired or wireless communicating means. Alternatively, the portable computer 2 may have both of the photograph means and display means built-in.

According to the foregoing embodiment, the collected data concerning a plurality of leak portions accumulated and stored in the storage section 18 of the portable computer 2 is taken out en bloc to the host computer 24.

Instead, the collected data may be transmitted to the host computer 24 as necessary during the serious of detecting operations by utilizing the cellphone function or PHS function. Conversely, various data may be transmitted from the host computer 24 to the mobile leakage detecting device 100 as appropriate by utilizing the cellphone function or PHS function. Also, the portable computer 2 may comprise a portable information terminal such as a PDA (Personal Digital Assistance), a cellphone or the like.

The input means for inputting the positional information of the leak portion is not limited to the area map marking means and positional data input means. Instead, any input means of various types including the type for inputting the positional information on the leak portion as document data by character entry, for example, may be employed.

In some cases, the photograph means for photographing the leak portion may be dispensable as a component of the mobile leakage detecting device 100. In one mode of carrying out the present invention, a construction may be employed for inputting the positional information of the leak portion only through the area map marking means.

The area map information used for marking by the area map marking means is not limited to the photographed image obtained by the photograph means such as a digital camera. Instead, an image taken from a scanner, an image taken from an image storage medium such as a compact disk, a digital versatile disk, a hard disk or the like, or a figured image prepared by drawing means such as a CAD system may be used. The area map information may be inputted from the host computer or the like through wired or wireless communicating means.

With respect to the arrangement of the plurality of directional microphones 3 for detecting the generated ultrasonic waves in the vertexes of the polygon 45, the polygon 45 is not limited to the hexagon, but may be any types of polygon.

The mobile leakage detecting device according to the present invention may be used for detecting various fluid leakages in a wide variety of fields such as fluid leakage in a pipe joint and a vessel and fluid leakage in valves such as a steam trap and a safety valve. Also, the leaking fluid may be either a gas such as steam or air, or a liquid such as water or a liquid agent.

The invention claimed is:

1. A mobile leakage detecting device comprising:
    a microphone for detecting ultrasonic waves generated at a fluid leak portion;
    input means for inputting positional information of the leak portion in a searching area by a key operation;
    photograph means for photographing the leak portion detected based on output signals from the microphone;
    display means for indicating the positional information inputted by the input means and photographed image information of the leak portion obtained by the photograph means; and
    data processing means for relating and storing the output data from the microphone, positional information inputted by the input means and photographed image information obtained by the photograph means on the same leak portion.

2. A mobile leakage detecting device as defined in claim 1 further comprising specific-position marking means for providing a mark for indicating a specific leak position on a screen displayed by the display means showing the photographed image information of the leak portion obtained by the photograph means, the specific-position marking means being provided separately from the input means, wherein the data processing means relates and stores the position indicated on the screen by the mark provided by the specific-position marking means, the corresponding positional information and the corresponding photographed image information.

3. A mobile leakage detecting device as defined in claim 2 wherein the input means includes area map marking means for providing a mark for indicating a position of the leak portion on a screen displayed by the display means showing area map information of the searching area, and wherein the data processing means relates and stores the position indicated on the screen by the mark provided by the area map marking means, as the positional information, and the output data from the microphone and photographed image information obtained by the photograph means on the same leak portion.

4. A mobile leakage detecting device as defined in claim 3 further comprising area map information storage means for storing the photographed image information of the searching area obtained by the photograph means as the area map information used for marking by the area map marking means.

5. A mobile leakage detecting device as defined in claim 1 wherein the input means includes positional data selecting means for allowing the operator to select data corresponding to the detected leak portion from a plurality of positional data indicated in the display means, and wherein the data processing means relates and stores the positional data selected by the positional data selecting means, as the positional information, and the output data from the microphone and photographed image information obtained by the photograph means on the same leak portion.

6. A mobile leakage detecting device as defined in claim 5 further comprising positional data storage means for storing the positional data used for data selection by the positional data selecting means to be rewritable by editing means.

7. A mobile leakage detecting device as defined in claim 1 further comprising computing condition data selecting means for allowing the operator to select data corresponding to the detected leak portion from computing condition data indicated on the display means, and computing means for computing an amount of fluid leakage in the corresponding leak portion based on the output data from the microphone and the data selected by the computing condition data selecting means on the same leak portion.

8. A mobile leakage detecting device as defined in claim 7 further comprising computing condition data storage means for storing the computing condition data used for data selection by the computing condition data selecting means to be rewritable by editing means.

9. A mobile leakage detecting device defined in claim 1, wherein a plurality of directional microphones are dispersedly provided in the same direction in vertex portions of a polygon such that directional ranges for the respective microphones have common overlapping portions, and wherein a light source is provided inwardly of the polygon as viewed from a directional direction of the microphones for emitting a light beam to the common overlapping portions of the directional ranges of the microphones.

10. A mobile leakage detecting device comprising:
    a plurality of directional microphones dispersedly provided in the same direction in vertex portions of a polygon such that directional ranges for the respective microphones have common overlapping portions each of said microphones for detecting ultrasonic waves generated at a fluid leak portion;
    a light source is provided inwardly of the polygon as viewed from a directional direction of the microphones for emitting a light beam to the common overlapping portions of the directional ranges of the microphones;
    display means for indicating area map information of a searching area;
    area map marking means for providing a mark for indicating a position of the leak portion in the searching area detected based on output signals from the microphone in a screen displayed by the display means; and
    data processing means for relating and storing the output data from the microphone and the position indicated on the screen by the mark provided by the area map marking means on the same leak portion.

11. A mobile leakage detecting device as claimed in claim 10,
    photograph means for photographing the leak portion,
    wherein the display means is adapted to indicate photographed image information of the leak portion obtained by the photograph means,
    and wherein the data processing means relates and stores the position indicated on the screen by the mark provided by the area map marking means, as the positional information, and the output data from the microphone and photographed image information obtained by the photograph means on the same leak portion.

12. A mobile leakage detecting device as defined in claim 11 further comprising area map information storage means for storing the photographed image information of the searching area obtained by the photograph means as the area map information used for marking by the area map marking means.

13. A mobile leakage detecting device defined in claim 10, area map information storage means for storing either photographed image information of the searching area obtained by the photograph means, image information of the searching area taken in from a scanner, or image information of the searching area taken out of an image storage medium as the area map information used for marking by the area marking means.

* * * * *